US005790913A

United States Patent [19]

Roberts, Jr. et al.

[11] Patent Number: 5,790,913

[45] Date of Patent: Aug. 4, 1998

[54] METHOD AND APPARATUS FOR MANUFACTURING A COLOR CRT

[75] Inventors: Owen Hugh Roberts, Jr., Landisville; Peter Michael Ritt, East Petersburg, both of Pa.; Peter David Southgate, Monmouth Jcn, N.J.; Robert Anthony Duschl, Lititz, Pa.

[73] Assignee: Thomson Consumer Electronics, Inc., Indianapolis, Ind.

[21] Appl. No.: 728,010

[22] Filed: Oct. 9, 1996

[51] Int. Cl.$^6$ .............................. G03B 29/00; H04N 7/18; G01B 11/02

[52] U.S. Cl. ............................ 396/546; 348/128; 356/384

[58] Field of Search ..................................... 396/546–547; 430/23, 24, 26, 30; 348/128; 356/381, 384

[56] References Cited

U.S. PATENT DOCUMENTS

| | | | |
|---|---|---|---|
| 4,187,012 | 2/1980 | Ueyama et al. | 396/546 |
| 4,498,779 | 2/1985 | Southgate et al. | 356/384 |
| 5,151,337 | 9/1992 | Wetzel et al. | 430/23 |
| 5,214,477 | 5/1993 | Hirobe et al. | 355/246 |
| 5,216,469 | 6/1993 | Yamada | 355/246 |
| 5,235,385 | 8/1993 | Rushing | 355/208 |
| 5,241,347 | 8/1993 | Kodama | 355/246 |
| 5,477,285 | 12/1995 | Riddle et al. | 354/1 |

*Primary Examiner*—Eddie C. Lee
*Assistant Examiner*—Nicholas J. Tuccillo
*Attorney, Agent, or Firm*—Joseph S. Tripoli; Dennis H. Irlbeck; Vincent J. Coughlin, Jr.

[57] ABSTRACT

In accordance with the present invention, a method for manufacturing a color CRT (10) having a faceplate panel (12) is disclosed. The method includes the steps of forming a photoreceptor (36) on an interior surface of a viewing faceplate (17); establishing a substantially uniform electrostatic charge on the photoreceptor (36); and exposing selected areas of the photoreceptor (36) to visible light to form a latent charge image. The process further includes the steps of developing the latent charge image on the photoreceptor (36) by depositing (212, 213, 214) thereon charged phosphor particles; monitoring the width (218) of the deposition of the charged phosphor particles; and terminating the deposition (226, 227, 228) of the charged phosphor particles when predetermined process parameters (222, 224) are satisfied. A phosphor deposition monitor (PDM) apparatus (90) for monitoring the deposition of the charged phosphor particles on the latent charge image, formed on the photoreceptor (36), also is described. The PDM apparatus (90) includes monitoring means (96, 99, 123) external to the viewing faceplate (17) for measuring the width (218) of the deposition of the charged phosphor particles. Control means (122) responsive to the monitoring means (96, 99,123) is utilized for terminating the deposition (226, 228) of the charged phosphor particles when the predetermined process parameters (222, 224) are satisfied.

10 Claims, 6 Drawing Sheets

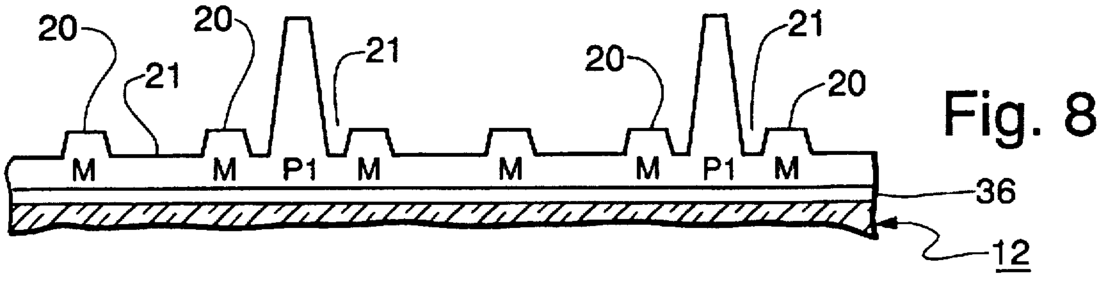
Fig. 8
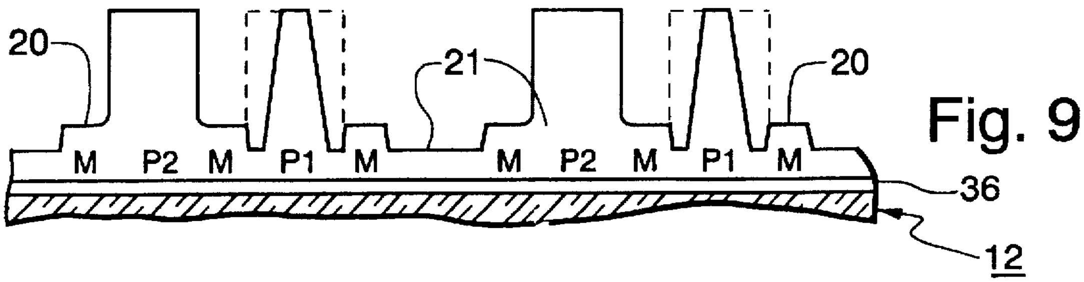
Fig. 9
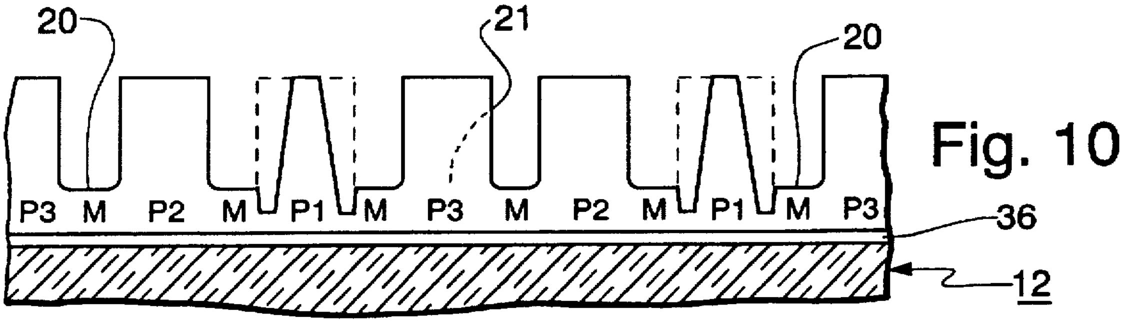
Fig. 10
Fig. 11
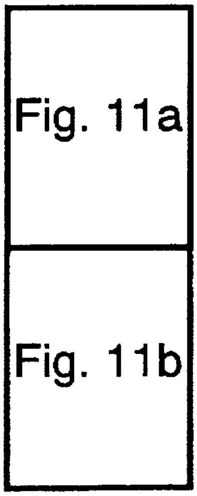

METHOD AND APPARATUS FOR MANUFACTURING A COLOR CRT

The invention describes a method and apparatus for manufacturing a color CRT using a deposit of charged phosphor particles and, more particularly, to a method and apparatus for monitoring the width of the resultant phosphor screen elements deposited within the openings in a light-absorbing matrix provided on an interior surface of a viewing faceplate of the CRT.

BACKGROUND OF THE INVENTION

An apparatus for developing a latent charge image on a photoreceptor that is disposed on an interior surface of a viewing faceplate of a display device, such as a cathode-ray tube (CRT), using triboelectrically charged particles, is described in U.S. Pat. No. 5,477,285, issued on Dec. 19, 1995, to G. H. N. Riddle et al. The deposition of each of three different color-emitting phosphors is controlled by sensing a voltage, proportional to the charge of the triboelectrically-charged phosphor particles deposited on a latent image formed on a photoreceptor, and monitoring this voltage to stop the deposition of the phosphor particles when the voltage reaches a predetermined value that corresponds to a specified phosphor thickness. The electrostatic phosphor screening (EPS) process, utilizing dry-powdered materials, is unique in that the phosphor deposits build from the center outwardly during the deposition, or developing, step. Thus, the thickness of the resultant phosphor lines in not uniform and decreases from the center of the lines to the edges.

A drawback of the voltage measuring approach is that in addition to phosphor thickness, the phosphor lines also must have a width sufficient to completely fill the openings in the matrix that has been provided on the interior surface of the CRT faceplate panel. Sensing the voltage developed by the triboelectrically deposited phosphor particles does not provide an indication of phosphor line width. If gaps occur between the sides of the phosphor lines and the light-absorbing matrix, the screen quality is judged to be unsatisfactory and the resultant brightness is not optimized. Accordingly, it is desirable not only to monitor the voltage developed by the deposition of the charged phosphor particles, but also to determine the width of the phosphor lines as phosphor development progresses.

SUMMARY OF THE INVENTION

In accordance with the present invention, a method for manufacturing a color CRT having a faceplate panel is disclosed. The method includes the steps of forming a photoreceptor on an interior surface of a viewing area of the faceplate panel; establishing a substantially uniform electrostatic charge on the photoreceptor; and exposing selected areas of the photoreceptor to visible light to form a latent charge image. The process further includes the steps of developing the latent charge image on the photoreceptor by depositing charged phosphor particles thereon; monitoring the width of the deposition of the charged phosphor particles; and terminating the deposition of the charged phosphor particles when predetermined process parameters are satisfied.

A phosphor deposition monitor (PDM) apparatus for monitoring the deposition of the charged phosphor particles on the latent charge image, formed on the photoreceptor, also is described. The PDM apparatus includes monitoring means external to the viewing faceplate for measuring the width of the deposition of the charged phosphor particles. Control means responsive to the monitoring means are utilized for terminating the deposition of the charged phosphor particles when the predetermined process parameters are satisfied.

BRIEF DESCRIPTION OF THE DRAWINGS

The invention will now be described in greater detail, with reference to the accompanying drawings in which:

FIGS. 8, 9 and 10 show phosphor line profiles for three stages of phosphor development.

DETAILED DESCRIPTION OF THE PREFERRED EMBODIMENT

Figure 1:
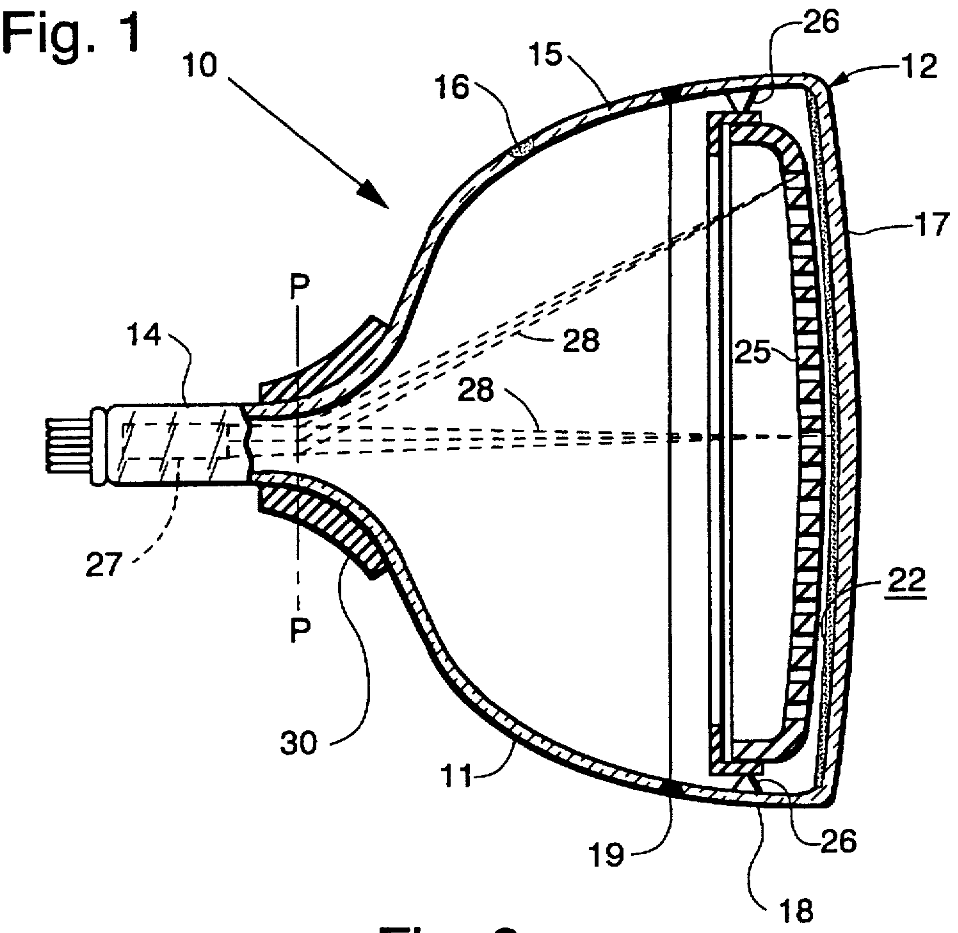
FIG. 1 is a plane view, partially in axial section, of a color CRT made according to the present invention.
Figure 2:
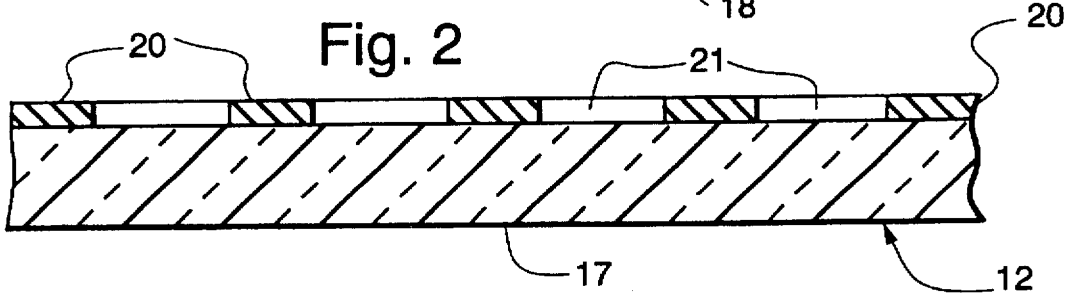
FIG. 2 is a section of a faceplate panel with a matrix on an interior surface thereof.

FIG. 1 shows a color CRT 10 having a glass envelope 11 comprising a rectangular faceplate panel 12 and a tubular neck 14 connected by a rectangular funnel 15. The funnel 15 has an internal conductive coating (not shown) that contacts an anode button 16 and extends into the neck 14. The panel 12 comprises a viewing faceplate 17 and a peripheral flange or sidewall 18, which is sealed to the funnel 15 by a glass flit 19. As shown in FIG. 2, a relatively thin, light absorbing matrix 20, having a plurality of openings 21, is provided on the interior surface of the viewing faceplate 17.

A luminescent three color phosphor screen 22 is carried on the interior surface of the faceplate 17 and overlies the matrix 20. The screen 22, shown in FIG. 3, preferably, is a line screen which includes a multiplicity of screen elements comprised of red-, blue-, and green-emitting phosphor stripes, R, B, and G, centered in different ones of the matrix openings 21 and arranged in color groups or picture elements of three stripes or triads, in a cyclic order. The stripes extend in a direction which is generally normal to the plane in which the electron beams are generated. In the normal viewing position of the embodiment, the phosphor stripes extend in the vertical direction. Preferably, portions of the phosphor stripes overlap at least a portion of the light absorptive matrix 20 surrounding the openings 21. A dot screen also may be formed by the novel process. A thin conductive layer 24, preferably of aluminum, overlies the screen 22 and provides means for applying a uniform potential to the screen, as well as for reflecting light, emitted from the phosphor elements, through the faceplate 17. The screen 22 and the overlying aluminum layer 24 comprise a screen assembly. Again with reference to FIG. 1, a multi-apertured color selection electrode, such as a shadow mask or focus mask, 25 is removably mounted, by conventional means, in predetermined spaced relation to the screen assembly. The color selection electrode 25 is detachably attached to a plurality of studs 26 embedded in the sidewall 18 of the panel 12.

An electron gun 27, shown schematically by the dashed lines, is centrally mounted within the neck 14, to generate and direct three electron beams 28 along convergent paths, through the apertures in the color selection electrode 25, to the screen 22. The electron gun is conventional and may be any suitable gun known in the art.

The tube 10 is designed to be used with an external magnetic deflection yoke, such as yoke 30, located in the region of the funnel-to-neck junction. When activated, the yoke 30 subjects the three beams 28 to magnetic fields which cause the beams to scan horizontally and vertically, in a rectangular raster, over the screen 22. The initial plane of deflection (at zero deflection) is shown by the line P—P in FIG. 1, at about the middle of the yoke 30. For simplicity, the actual curvatures of the deflection beam paths, in the deflection zone, are not shown.

The screen 22 is manufactured by an electrophotographic screening (EPS) process that is described in U.S. Pat. No. 4,921,767, issued to Datta et al. on May 1, 1990. Initially, the panel 12 is cleaned by washing it with a caustic solution, rinsing it in water, etching it with buffered hydrofluoric acid and rinsing it again with water, as is known in the art. The interior surface of the viewing faceplate 17 is then provided with the light absorbing matrix 20, preferably, using the conventional wet matrix process described in U.S. Pat. No. 3,558,310, issued to Mayaud on Jan. 26, 1971. In the wet matrix process, a suitable photoresist solution is applied to the interior surface, e.g., by spin coating, and the solution is dried to form a photoresist layer. Then, the color selection electrode 25 is inserted into the panel 12 and the panel is placed onto a three-in-one lighthouse (not shown) which exposes the photoresist layer to actinic radiation from a light source which projects light through the openings in the color selection electrode. The exposure is repeated two more times with the light source located to simulate the paths of the electron beams from the three electron guns. The light selectively alters the solubility of the exposed areas of the photoresist layer. After the third exposure, the panel is removed from the lighthouse and the color selection electrode is removed from the panel. The photoresist layer is developed, using water, to remove the more soluble areas thereof, thereby exposing the underlying interior surface of the viewing faceplate, and leaving the less soluble, exposed areas of the photoresist layer intact. Then, a suitable solution of light-absorbing material is uniformly provided onto the interior surface of the faceplate panel to cover the exposed portion of the viewing faceplate and the retained, less soluble, areas of the photoresist layer. The layer of light-absorbing material is dried and developed using a suitable solution which will dissolve and remove the retained portion of the photoresist layer and the overlying light-absorbing material, forming openings 21 in the layer of matrix 20 which is adhered to the interior surface of the viewing faceplate. For a panel 12 having a diagonal dimension of 51 cm (20 inches), the openings 21 formed in the matrix 20 have a width of about 0.13 to 0.18 mm, and the opaque matrix lines have a width of about 0.1 to 0.15 mm. The interior surface of the viewing faceplate 17, having the matrix 20 thereon, is then coated with a suitable layer of a volatilizable, organic conductive (OC) material, not shown, which provides an electrode for an overlying volatilizable, organic photoconductive (OPC) layer, also not shown. The OC layer and the OPC layer, in combination, comprise a photoreceptor 36, shown in FIG. 4.

Suitable materials for the OC layer include certain quaternary ammonium polyelectrolytes described in U.S. Pat. No. 5,370,952, issued to P. Datta et al. on Dec. 6, 1994. Preferably, the OPC layer is formed by coating the OC layer with a solution containing polystyrene; an electron donor material, such as 1,4-di(2,4-methyl phenyl)-1,4 diphenylbutatriene (2,4-DMPBT); electron acceptor materials, such as 2,4,7-trinitro-9-fluorenone (TNF) and 2-ethylanthroquinone (2-EAQ); and a suitable solvent, such as toluene, xylene, or a mixture of toluene and xylene. A surfactant, such as silicone U-7602 and a plasticizer, such as dioctyl phthalate DOP), also may be added to the solution. The surfactant U-7602 is available from Union Carbide, Danbury, Conn. The photoreceptor 36 is uniformly electrostatically charged using a corona discharge device (not shown), described in U.S. Pat. No. 5,083,959, issued on Jan. 28, 1992, to Datta et al., which charges the photoreceptor 36 to a voltage within the range of approximately +200 to +700 volts. The color selection electrode 25 is then inserted into the panel 12, which is placed onto a lighthouse (also not shown) and the positively charged OPC layer of the photoreceptor 36 is exposed, through the color selection electrode 25, to light from a xenon flash lamp, or other light source of sufficient intensity, such as a mercury arc, disposed within the lighthouse. The light which passes through the apertures in the color selection electrode 25, at an angle identical to that of one of the electron beams from the electron gun of the tube, discharges the illuminated areas on the photoreceptor 36 and forms a latent charge image. The color selection electrode 25 is removed from the panel 12 and the panel is placed onto a first phosphor developer 40, such as that shown in FIG. 4. The developer 40 comprises a developing chamber 42 having a bottom end 44 and a top end, or panel support, 46. The panel support 46, preferably, is formed of insulative material and includes an opening 48 therethrough which is slightly smaller in dimensions than the CRT faceplate panel 12. The panel 12 is supported on the panel support 46. The developing chamber 42 further includes a exterior sidewall 50 that extends between the bottom end 44 and the panel support 46. A conductive interior sidewall 52 is spaced from the exterior sidewall 50 and extends from a conductive interior bottom end 54 to a plane A—A adjacent to the panel support 46. The conductive interior sidewall 52 and bottom end 54 attract excess phosphor from the cloud of charged phosphor, preventing a buildup of space charge within the chamber 42, or of a high electrostatic potential on the chamber sidewall. A gap 56, located at the top periphery of the chamber 42, between the exterior and interior sidewalls 50 and 52, provides a path to remove excess phosphor particles that are not deposited onto the latent charge image formed on the photoreceptor 36. An exhaust port 58 is connected to a pump (not shown) to remove the excess phosphor particles from the developer 40.

An electrical contact, such as a stud contact spring 60 is provided to contact one of the studs 26 embedded in the sidewall 18 of the faceplate panel 12. The conductive coating of the photoreceptor 36 is electrically connected, by means of a contact patch (not shown), to the stud 26. The contact patch is described in U.S. Pat. No. 5,156,770, issued to Wetzel et al. on Oct. 20, 1992. The electrical contact 60 is connected to, and grounded through, a capacitor 64 which develops a voltage proportional to the charge of the triboelectrically-charged phosphor particles deposited on the latent charge image on the photoreceptor 36. The voltage developed on the capacitor 64 is monitored by an electrometer 66 and is connected to a controller 68 which is programmed to terminate the phosphor deposition when the voltage reaches a predetermined value that corresponds to the required phosphor thickness. Prior to each development cycle, the voltage on the capacitor 64 is discharged to ground through a contact 70, by action of the controller 68. A high voltage source 72 is connected to a development grid 74 to control the electric field in the vicinity of the latent charge image formed on the photoreceptor 36. The structure and function of the development grid 74 are described in U.S. Pat. No. 5,093,217, issued on Mar. 3, 1992, to Datta et al. The grid 74 is positively biased at about 3 kV and has the same polarity as that of the triboelectrically-charged phosphor particles being deposited onto the latent charge image.

A separate developer 40 is required for each of the three color emissive phosphors, to prevent cross contamination which would otherwise occur if a single developer were utilized and different color emitting phosphors materials were fed into a common chamber. External to the developing chamber 42 is a phosphor reservoir 76 which contains a supply of dry-powdered phosphor particles.

Figure 3:
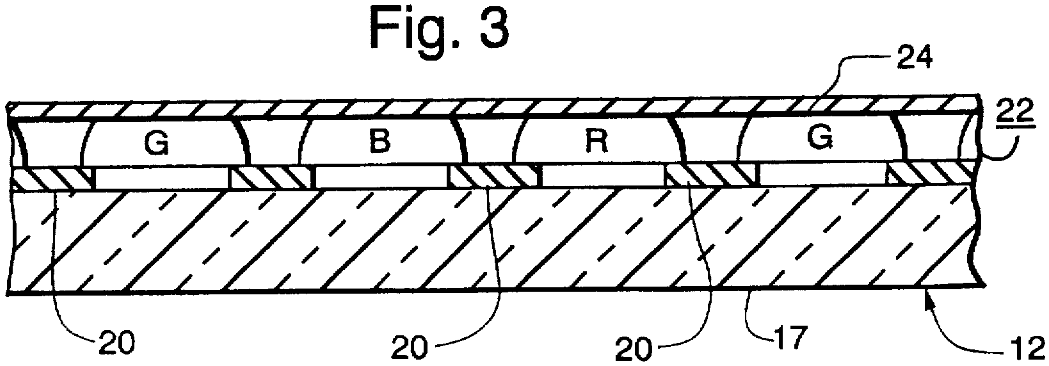
FIG. 3 is a section of a screen assembly of the tube shown in FIG. 1.

During the developing operation, the phosphor particles are transported from the reservoir 76 to a venturi chamber 78 where the phosphor particles are mixed with a suitable quantity of air. The actuation of the air supply is accomplished by opening a valve 80 that is controlled by the controller 68. The air pressure is set by a pressure regulator 82. The phosphor particles are carried into the chamber 42 and through a triboelectric gun 84, where the phosphor particles are positively triboelectrical-charged and directed toward the latent charge image on the photoreceptor 36. The positively charged first color-emitting phosphor particles are repelled by the positively charged areas on the photoreceptor 36 and deposited onto the discharged areas thereof by the process known in the art as "reversal" development. In reversal development, triboelectrically charged particles of screen structure material are repelled by similarly charged areas of the photoreceptor 36 and deposited onto the discharged areas thereof. The phosphor lines of the first color-emitting phosphor are deposited within selected ones of the openings 21 in the matrix 20 and build in width and height from the center of the openings 21 to the edges of the surrounding matrix. When the deposition is complete, it is necessary that the phosphor lines be slightly larger than the size of the openings 21 in the light-absorbing matrix 20, as shown in FIG. 3, to completely fill each of the openings, and slightly overlap the light-absorbing matrix surrounding the openings.

Figure 4:
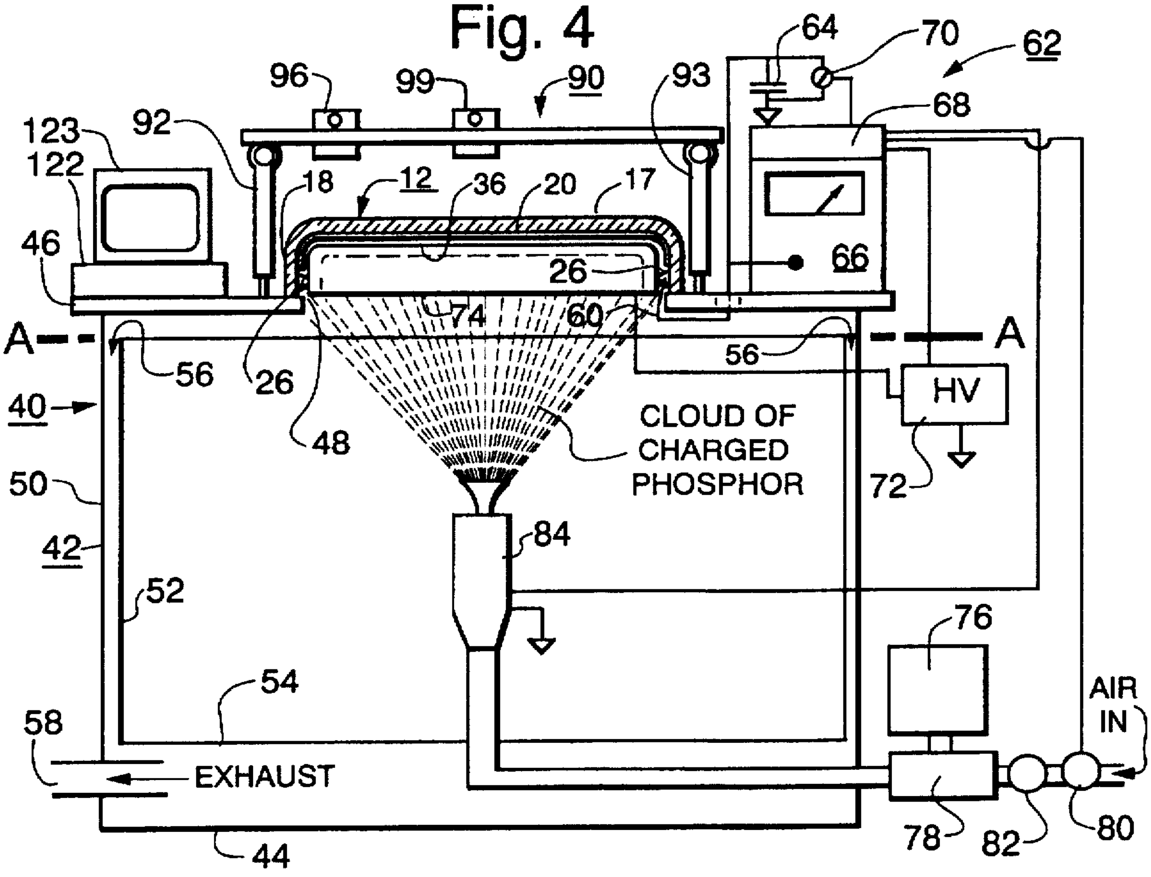
FIGS. 4 and 5 show, respectively, a front view and a top view of a novel phosphor deposition monitor (PDM) apparatus for measuring the width of a phosphor deposit.
Figure 5:
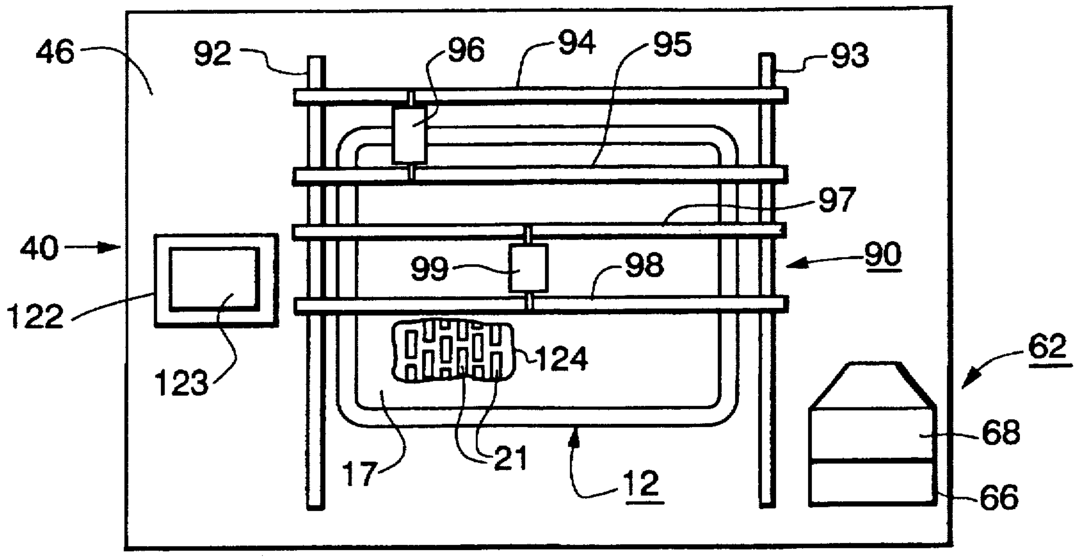
Figure 6:
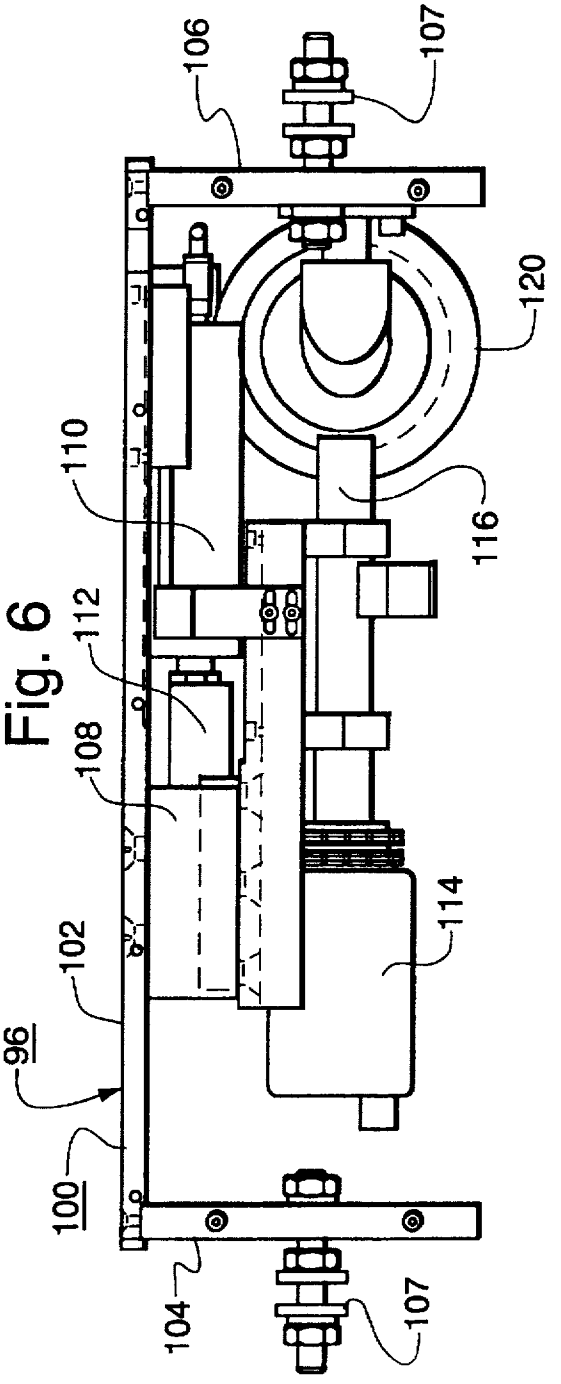
FIGS. 6 and 7 show, respectively, a top view and a side view of an imaging device used in the PDM apparatus of FIGS. 4 and 5.
Figure 7:
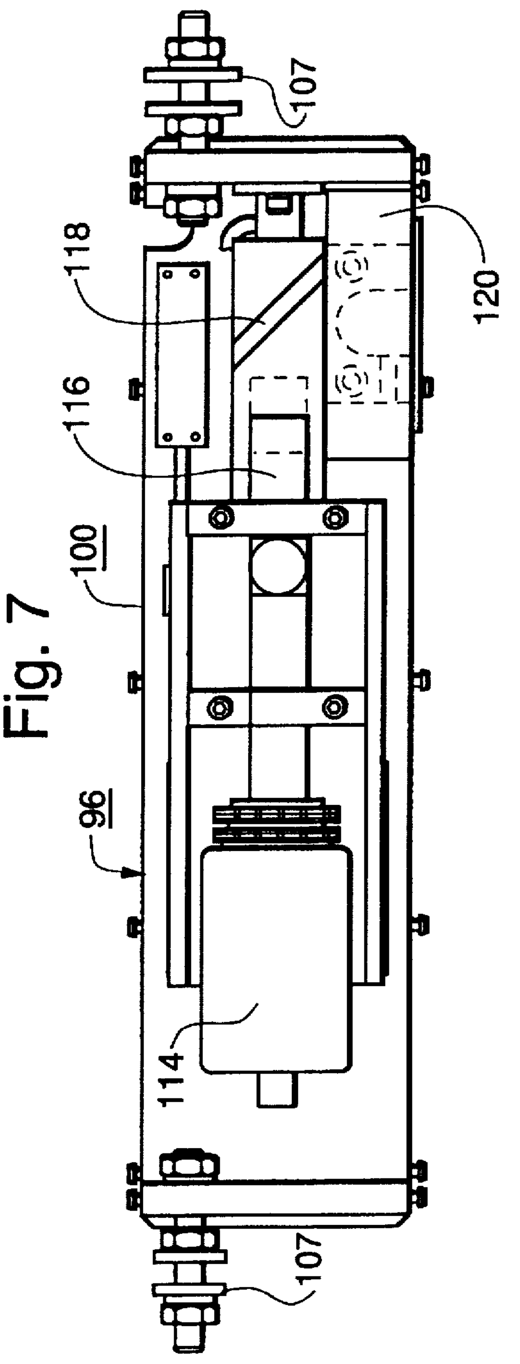

With reference to FIGS. 4 and 5, a novel phosphor deposition monitor (PDM) apparatus 90 includes a support assembly having a pair of side rails 92 and 93 that are mounted to the support surface 46 of the developer 40, adjacent to the opening 48. The side rails 92 and 93 are sufficiently spaced apart to permit a faceplate panel 12 to be positioned on the support surface 46 without interference from the side rails. A first pair of cross rails 94 and 95 are slidingly attached to the side rails 92 and 93 and support a first imaging device 96 that is slidingly attached to the cross rails 94 and 95. A second pair of cross rails 97 and 98 also are slidingly attached to the side rails 92 and 93 and support a second imaging device 99 that is slidingly attached to the second pair of cross rails 97 and 98. The imaging devices, 96 and 99, are mounted about 15 cm (6 inches) above the viewing faceplate. Each of the imaging devices 96 and 99 is movable in the x-y plane and can be tilted to be substantially parallel to the curvature of the viewing faceplate 17. Additionally, the imaging devices 96 and 99 can be positioned anywhere above the viewing faceplate 17. As shown in FIG. 5, one of the imaging devices, for example, device 99, is usually positioned near the center of the panel 12 while the other imaging device 96 is adjacent to the periphery of the panel. The side rails 92 and 93 are sufficiently long to permit the imaging devices 96 and 99 to be withdrawn from above the opening 48 to facilitate positioning and removing faceplate panels 12 from the developer 40. The imaging device 96, shown in FIGS. 6 and 7, includes a support frame 100 comprising a main body portion 102 and two oppositely disposed end portions 104 and 106 which are attached to the main body portion 102. A mounting bracket 107 is affixed to each end portion 104 and 106 to facilitate mounting the imaging devices, 96 and 99, on the appropriate cross rails 94, 95 and 97, 98. A support bracket 108 and a motor 110 are secured to the main body portion 102, in spaced relation to each other. A motor shaft 112 extends from the motor 110 and is attached to a camera 114 to move the camera within the support bracket 108, in a plane parallel to the main body portion 102. An objective lens 116 is attached to the camera 114. In order to minimize the height of the imaging device 96 and not interfere with the panel transfer equipment, not shown, a 45 degree-angle mirror 118, shown in FIG. 7, is utilized to fold the optical path. If the height of the imaging devices 96 and 99 is not critical, then the mirror 118 is not required and the imaging devices may be mounted vertically. The motor 110 moves the entire camera/lens assembly, instead of just the objective lens 116, to focus the camera 114 on the phosphor lines which comprise the screen elements. This focusing arrangement provides a constant magnification for any focus position, thereby improving the accuracy of the line width measurements. A coaxial fiber optic light ring 120 is disposed below the mirror 118 to provide uniform, glare-free illumination of the object to be viewed. Electrical connections to the motor 110, the camera 114 and the light ring 120 are conventional, and, therefore, not shown.

Again with reference to FIGS. 4 and 5, an image processor 122, such as a personal computer having a video monitor 123, is connected to the cameras of the first and second imaging devices 96 and 99 to store and display linewidth data and image the triads that comprise an arbitrarily defined measurement window, such as window 124, shown in FIG. 5, on the viewing faceplate 17. The video monitor 123 of the image processor 122 shows the width of the phosphor lines during the deposition process. Deposition is complete when the phosphor completely fills the openings 21 in the matrix 20 and at least partially overlaps the light absorbing material of the matrix 20 that surrounds the openings 21.

During the deposition of the first color emitting phosphor, the phosphor deposition builds from the center of the openings 21 toward the edge of the matrix 20, as shown by the monotonic rise and fall to the phosphor profile edges in FIG. 8. In FIG. 8, the matrix lines 20 are designated "M", the first color emitting phosphor is designated P1 and the matrix openings, 21. Underneath the matrix and the phosphor is the photoreceptor 36 and the interior surface of the faceplate panel 12. When viewed on the monitor 123, the matrix lines appear black and the openings between adjacent matrix lines, where the phosphors are to be deposited, appear dark and less pronounced than the matrix lines. The present phosphor deposition sequence provides that the first color emitting phosphor, P1, deposited on the photoreceptor 36, is the blue-emitting phosphor. In FIG. 8, the phosphor P1 does not completely fill the opening 21 in order to show the phosphor during the deposition by the EPS process. However, the deposition is continued until the openings 21, in which the first phosphor is deposited, are filled and, preferably, there is an overlap of the matrix 20, as shown in FIG. 3. The output of each of the imaging devices 96 and 99 is fed into the image processor 122, so that the linewidth data is updated about two times each second. Line width data can be utilized with either elapsed time values or electrostatic charge and its proportional voltage, as measured on sample panels that are used to establish calibration values, so that a smooth growth function for line width can be matched to the accumulated data. Because it is not possible to visually measure the line width growth after the openings 21 are filled, the calibration values, of elapsed time and/or electrostatic charge obtained on sample panels, are utilized to determine the cutoff time for phosphor deposition on production panels.

After the first phosphor deposition is completed, the panel 12 is removed from the phosphor developer 40 and transferred to the above-described corona discharge apparatus, where it is electrostatically recharged. Recharging reestablishes a positive voltage on the photoreceptor 36 and on the first color-emitting phosphor material, P1, deposited thereon. The light exposure and phosphor development steps are repeated for each of the two remaining color-emitting phosphors, P2 and P3. When the panel 12 is placed on the second and third phosphor developers 40, the imaging devices 96 and 99 image the prior deposited phosphor lines and act as inspection devices to permit termination of the deposition process if the prior phosphor depositions are misregistered or otherwise unacceptable. As shown in FIGS. 9 and 10, the size of each of the lines of the two remaining color-emitting phosphors, P2 and P3, on the photoreceptor 36 also is larger than the size of the matrix openings 21, to ensure that no gaps occur and that a slight overlap of the light-absorbing matrix "M" surrounding the openings is provided.

Figure 11A:
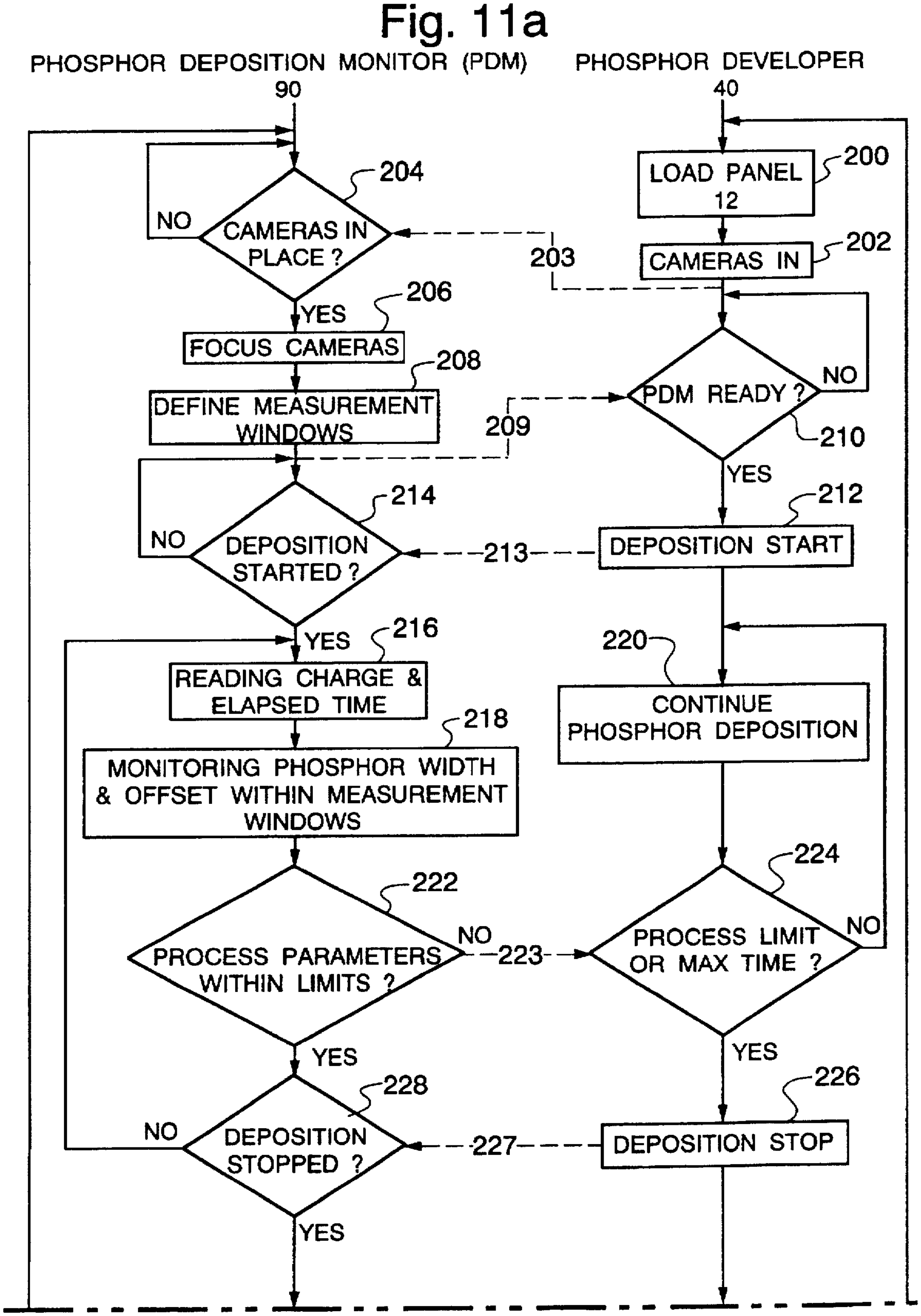
FIG. 11 is a flow diagram showing the process steps in the present invention.
Figure 11B:
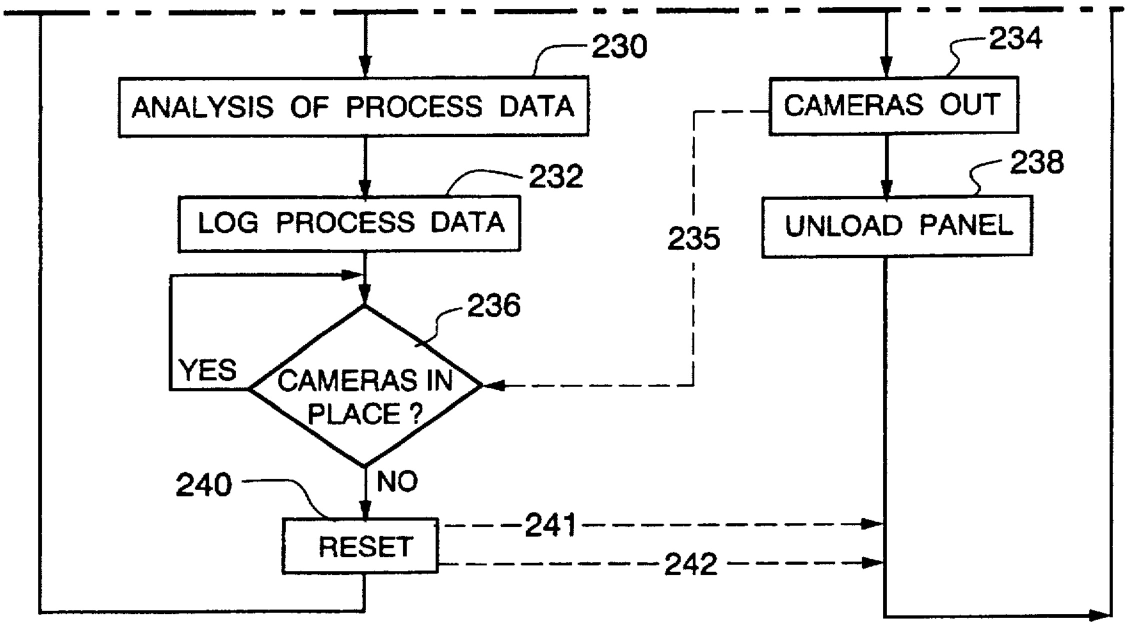

The interaction between the phosphor deposition monitor (PDM) apparatus 90 and the phosphor developer 40 is shown in FIG. 11. The faceplate panel 12 with the matrix 20 and the photoreceptor 36 thereon is loaded onto panel support 46 in process step 200. The imaging devices 96 and 99, containing cameras 114, are positioned above the faceplate panel 12, one camera in the vicinity of the center of the viewing faceplate 17 and the other at a location near the edge of the panel, in process step 202. When the cameras are in position, a communication signal 203 is sent to the PDM 90 to determine whether the cameras are in place. The placement of the cameras is determined in step 204. When it is determined that the cameras are in place, the cameras are focused in step 206 and the measurement window 124 on the viewing faceplate 17 is defined in step 208. At this point in the operation, a camera ready signal 209 is sent to the developer 40. If it is determined that the PDM 90 is ready in step 210, the developer 40 initiates deposition of the first phosphor in step 212. A communications signal 213 is sent from the developer 40 to the PDM 90 to ascertain whether deposition has started in step 214. When deposition of the first triboelectrically-charged phosphor in initiated, the charge deposited on the photoreceptor is read by the electrometer 66 and the elapsed time is recorded by the PDM, as indicated in step 216. The imaging devices 96 and 99 are utilized in conjunction with suitable software for the image processor 122 to measure the width of the phosphor lines, and any offset thereof, in the appropriate matrix openings 21 of the measuring window 124, as indicated in step 218, as the phosphor deposition continues in step 220. The process parameters of accumulated charge, elapsed time and phosphor width are compared to the established limits, as indicated in step 222, and if the limits have not been exceeded, a communication signal 223 is sent to the phosphor developer 40 where, in step 224, a determination is made of whether the process limit or the maximum deposition time have been exceeded. If the process limit or maximum deposition time have not been exceeded, the phosphor deposition is continued. However, if the process limit or maximum deposition time has been exceeded, the deposition is stopped, as indicated in step 226, and a communication signal 227 is sent to the PDM 90, as indicated in step 228. When the deposition is stopped, the process data is analyzed in step 230 and logged in step 232. At this time the cameras are removed from above the faceplate 12, as indicated in step 234, and a communication signal 235, to determine the camera positions, is sent to the PDM 90, in step 236. Then, the faceplate panel 12 is unloaded, in step 238 and the PDM 90 resets, in step 240, by sending initializing signals 241 and 242 to ensure that the cameras are ready and that the process limitations are established, respectively, for the next panel. The panel 12 having the first phosphor, P1, then is electrostatically recharged and the color selection electrode 25 is repositioned therein. Next, the panel 12 is placed on a lighthouse, not shown, where the photoreceptor 36 is light exposed in the areas where the second phosphor, P2, will be deposited. The color selection electrode is removed from the panel 12 and the panel is transferred to a second developer 40 for deposition of the second color-emitting phosphor, P2. The process is repeated, again the third color-emitting phosphor, P3. Each of the phosphor developers 40 has a PDM 90 associated therewith to monitor line width data for each of the phosphors.

What is claimed is:

1. A phosphor deposition monitor (PDM) apparatus, for monitoring the width of the deposition of charged phosphor particles on a latent charge image formed on a photoreceptor overlying a light absorbing matrix having a plurality of openings therein, said matrix being disposed on an interior surface of a viewing faceplate of a CRT faceplate panel, including a monitoring device, external to said viewing faceplate, for measuring the width of the phosphor lines formed within the openings in said matrix due to the deposition of the charged phosphor particles, and a control device, responsive to said monitoring device of said PDM apparatus, for generating a control signal for terminating the deposition of the charged phosphor particles when predetermined process parameters are satisfied.

2. In an apparatus for depositing and monitoring the deposition of triboelectrically charged phosphor particles onto an electrostatic latent charge image formed on a photoreceptor disposed on a matrix having a plurality of openings therein, said matrix overlying an interior surface of a viewing faceplate of a CRT faceplate panel, said apparatus comprising a phosphor developer having a developing chamber with a panel support to support said faceplate panel, said chamber providing triboelectrically-charged phosphor particles to develop said latent charge image on said photoreceptor, an electrical contact connected to said photoreceptor, a first monitoring device, including an electrometer connected through a capacitor to said electrical contact, to measure the amount of charge being deposited onto said latent charge image by the triboelectrically-charged phosphor particles, wherein the improvement comprises a second monitoring device, including an imaging device external to said viewing faceplate, an image processor and a video monitor for imaging the deposition of the triboelectrically charged phosphor particles onto said latent charge image, said video monitor being connected to said imaging device to facilitate displaying a measurement window on said viewing faceplate; and said first and said second monitoring devices generating a control signal to terminate the deposition of the triboelectrically-charged phosphor particles when predetermined process parameters are satisfied.

3. In an apparatus for depositing and monitoring the deposition of triboelectrically charged phosphor particles onto a latent charge image formed on a photoreceptor disposed on a matrix having a plurality of openings therein, said matrix being on an interior surface of a viewing faceplate of a CRT faceplate panel, said apparatus comprising a phosphor developer having a developing chamber with a panel support to support said faceplate panel, said chamber further including a means for triboelectrically charging the phosphor particles and an opening in said panel support to permit the triboelectrically charged particles to pass therethrough to said latent charge image on said photoreceptor, an electrical contact connected to said photoreceptor, first monitoring means connected to said electrical contact to measure the amount of charge being deposited onto said latent charge image by the triboelectrically charged phosphor particles, wherein the improvement comprises a phosphor deposition monitor (PDM) apparatus including a second monitoring means, external to said viewing faceplate, for measuring the size of the screen elements formed by the deposition of the triboelectrically charged phosphor particles onto said latent charge image; and control means, responsive to said first monitoring means and to said second monitoring means, for generating a control signal to terminate the deposition of the triboelectrically charged phosphor particles when predetermined process parameters are satisfied.

4. The apparatus as described in claim 3, wherein the second monitoring means comprises an imaging device spaced from an exterior surface of said viewing faceplate for viewing a measurement window on said viewing faceplate, and an image processor having a video monitor connected to said imaging device for displaying said measurement window.

5. The apparatus as described in claim 4, wherein said imaging device includes a support frame comprising a main body portion and two oppositely disposed end portions attached to said main body portion, a support bracket and a motor being secured to said main body portion, a motor shaft extending from said motor and being secured to a camera having an objective lens attached thereto, said motor moving both said camera and said objective lens in a plane parallel to said main body portion to focus said camera by imaging said screen elements onto said objective lens.

6. The apparatus as described in claim 5, further including a tilted mirror spaced from said objective lens, and a glare-free light source disposed between said tilted mirror and said screen elements.

7. The apparatus as described in claim 6, where said glare-free light source is a coaxial fiber optic light ring and said mirror is tilted at an angle of 45 degrees.

8. The apparatus as described in claim 3, wherein said control mean comprises a series of periodic phosphor line width measurements made during the deposition of said phosphor particles on said photoreceptor, said series of phosphor line width measurements being compared to a desired line width value.

9. The apparatus as described in claim 3, wherein said control means further comprises a predetermined calibration value of line-width versus deposited charge, the amount of charge measured by said electrometer being utilized to regulate the deposition time by reference to the predetermined calibration value.

10. The apparatus as described in claim 3, wherein said control means comprises a visual measurement of phosphor line width on said video monitor.

* * * * *